March 12, 1963    L. D. GIBSON    3,081,064
CRANE ATTACHMENT FOR BUMPER JACKS
Filed May 29, 1961    2 Sheets-Sheet 2
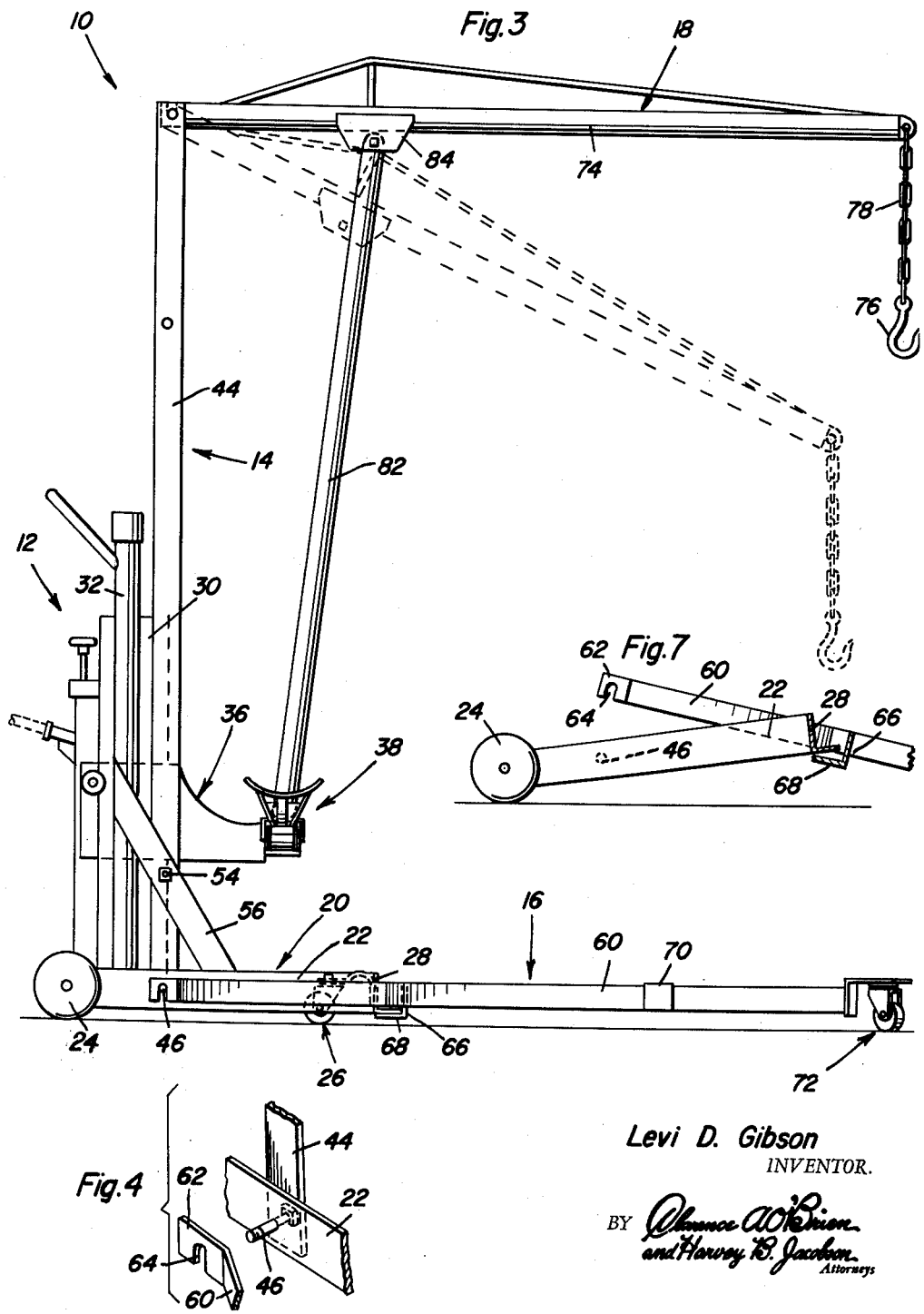
Levi D. Gibson
INVENTOR.

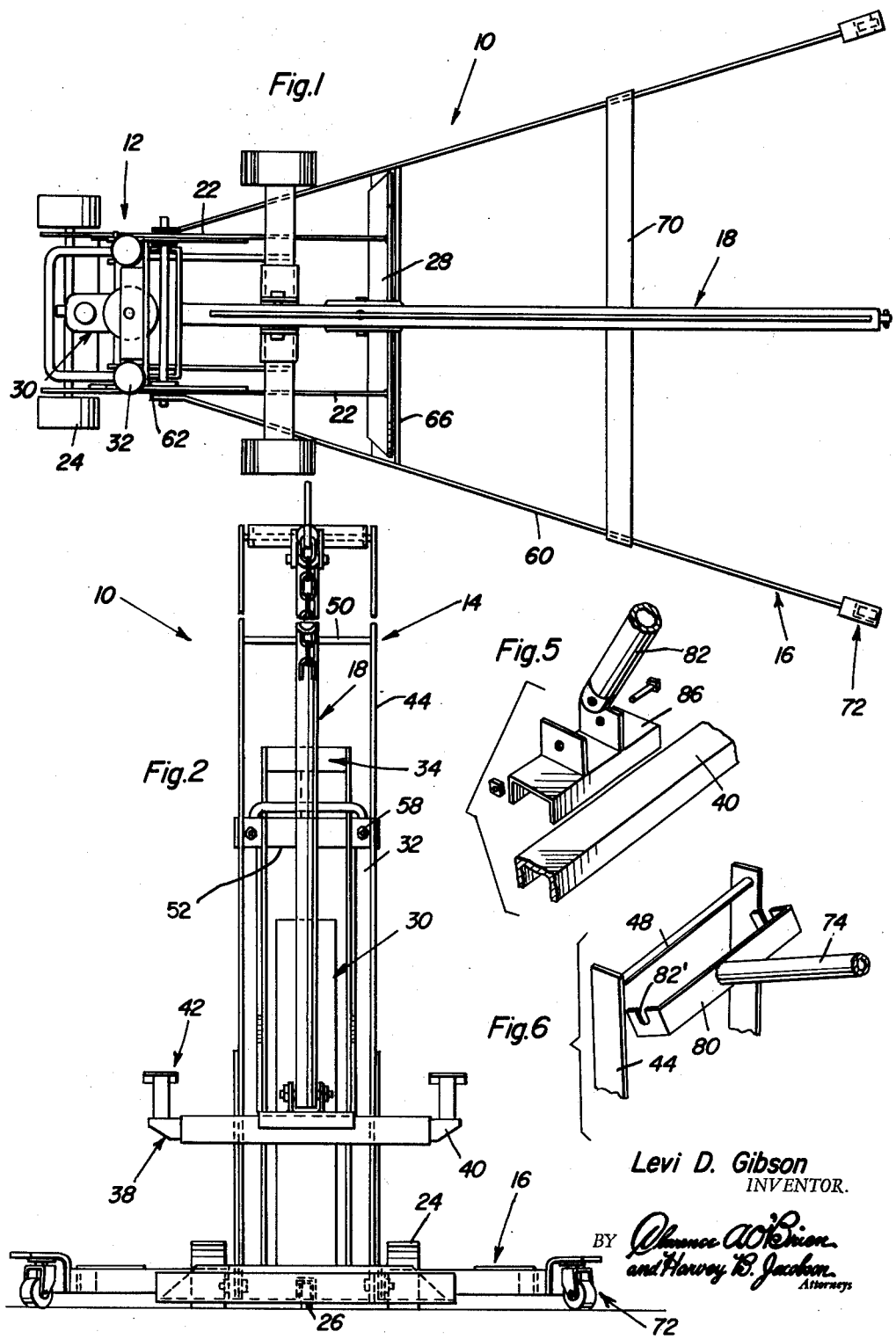

United States Patent Office 3,081,064
Patented Mar. 12, 1963

3,081,064
CRANE ATTACHMENT FOR BUMPER JACKS
Levi D. Gibson, 740 W. 5th, Rte. 3, Baxter Springs, Kans.
Filed May 29, 1961, Ser. No. 113,426
8 Claims. (Cl. 254—2)

This invention relates to a new and useful attachment for floor bumper jacks capable of converting the bumper jack into a combination crane and bumper jack.

It is therefore a primary object of the present invention, to provide an attachment for bumper jacks which requires a minimum amount of assembly and disassembly, in order to convert a bumper jack commonly used by automotive service stations, into a crane capable of handling motors and other heavy parts when repairing automotive vehicles or performing similar services on premises which have available floor type bumper jacks.

Another object of this invention is to provide an attachment for floor type bumper jacks which includes only one rigidly attached assembly, the other parts of the attachment being removably assembled onto the bumper jack without any additional connecting fasteners or tools, the resulting crane attachment nevertheless being capable of accomplishing its purpose in an efficient manner without becoming disassembled when loaded.

A further object of this invention is to provide a crane attachment for various types of bumper jacks capable of handling heavy loads without interfering with the operation of and use of the bumper jack itself.

In accordance with the foregoing objects, the present invention involves the rigid attachment of an upright assembly to the frame of a bumper jack which may be of the mechanical or hydraulic type, having a vertically operating lift mechanism mounted rearwardly of a wheeled frame with a load engaging element connected to the lifting mechanism and projecting forwardly therefrom above the forward portion of the wheel frame. The upright assembly after being rigidly attached to the frame will extend upwardly a substantial distance above the lifting mechanism. A base assembly is then removably assembled onto the frame by rearward tilting of the bumper jack enabling the base assembly to pivotally receive at its rear end the bolt connection by means of which the lower end of the upright assembly is connected to the frame. The forward end of the frame is then carried on an intermediate support member of the base assembly. The boom assembly is similarly removably assembled to the upper end of the upright assembly with disassembly being prevented by any load on the forward end of the boom which is also supported intermediate its ends by a strut member pivotally connected at the upper end to the boom and at the lower end to a member resting on the load engaging element of the bumper jack. The upright assembly does not interfere with the operation of the bumper jack when used as such and also provides a convenient method for assembly onto the bumper jack of the base assembly and boom components as hereinbefore mentioned so as to convert the bumper jack into a crane.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the combined bumper jack and crane attachment of the present invention.

FIGURE 2 is a front elevational view of the combination illustrated in FIGURE 1.

FIGURE 3 is a side elevational view of the combination crane and bumper jack.

FIGURE 4 is a partial perspective view of disassembled portions of the bumper jack frame and the base assembly of the crane attachment.

FIGURE 5 is a partial perspective view of disassembled portions of the bumper jack load engaging element and the boom assembly.

FIGURE 6 is a partial perspective view of disassembled portions of the upright assembly and the boom assembly.

FIGURE 7 is a partial sectional view illustrating the manner in which the base assembly of the crane attachment is assembled onto the frame of the bumper jack.

Referring now to the drawings in detail, FIGURES 1, 2 and 3 illustrate the combined crane and bumper jack of the present invention which is generally referred to by the reference numeral 10. It will be observed, that the combination involves a conventional type of hydraulic floor bumper jack generally referred to by reference numeral 12 to which the crane attachment of the present invention is connected. The crane attachment includes three basic components, namely, an upright assembly generally referred to by reference numeral 14 which is rigidly attached to the bumper jack 12, a base assembly generally referred to by reference numeral 16 which is removably assembled onto the frame of the bumper jack 12 and a boom assembly generally referred to by reference numeral 18 which is removably assembled onto the upright assembly 14 and the load engaging element of the bumper jack.

The bumper jack 12 is of the type which includes a base frame generally referred to by reference numeral 20 including a pair of parallel frame members 22. The frame members 22 are supported rearwardly thereof by a wheel assembly 24. The forward end of the frame 20 of the bumper jack 12 is normally supported by a caster wheel assembly 26. The caster wheel assembly 26 is therefore connected to a central portion of a forward angle frame member 28 which is connected to the forward ends of the side frame members 22 as by welding. The angle iron member 28 as more clearly seen in FIGURE 1, extends laterally beyond the side frame members 22. Mounted rearwardly of the frame assembly 20 is a hydraulic lifting mechanism generally referred to by reference numeral 30 which is disposed between a pair of post frame members 32 fixed to the frame assembly 20. A slide assembly 34 is therefore vertically raised or lowered by the hydraulic lifting mechanism 30 and is connected by a forwardly projecting assembly 36 which is guidingly mounted with respect to the upright frame post members 32 for carrying the load engaging head or assembly 38 at its forward end. The load engaging assembly 38 includes a transversely extending saddle bar or element 40 to which a pair of load receiving saddles or elements 42 are mounted, said elements 42 being spaced and shaped for accommodating special load situations for which the particular bumper jack is designed. The foregoing description of the bumper jack 12 is merely exemplary of the type of bumper jack to which the present invention is applicable. Accordingly, the type of lifting mechanism utilized may be mechanical rather than hydraulic and the actual shape of the load engaging assembly and the base frame assembly may differ.

The upright assembly 14 as was hereinbefore indicated, is rigidly attached to the bumper jack frame. The upright assembly therefore includes a pair of vertical frame members 44 which are connected at their lower ends to the side frame members 22 of the frame 20 by bolt members 46 as more clearly seen in FIGURE 4. The frame members 44 are also interconnected at their upper ends by rod member 48 as more clearly seen in FIGURE 6 while intermediate the upper and lower ends of the frame members 44, interconnection is provided by the rod member 50 and a connecting member 52. The frame members 44 being connected at their lower ends to the frame 20 by the bolts 46 are also connected to the bumper jack frame by fasteners 54 which connect the frame members 44 to the brace members 56 extending between the side frame members 22 and the posts 32. A further connection is provided between the frame members 44 and the bumper jack frame by fasteners 58 which connect the upper ends of the posts 32 to the connecting member 52, as more clearly seen in FIGURE 2. Accordingly, by means of a minimum of six bolt assemblies, 46, 54 and 58, a rigid connection of the upright assembly 14 to the bumper jack, may be made with minimum effort and expense and yet not interfere with the operation and use of the bumper jack.

Once the upright assembly 14 has been attached as hereinbefore indicated assembly and disassembly of the base assembly 16 of the crane attachment is made possible and facilitated. The base assembly 16 therefore includes a pair of elongated frame members 60 which extend forwardly from the bumper jack in diverging relation as more clearly seen in FIGURE 1. The rear ends of the members 60 have bent tab portions 62 as more clearly seen in FIGURES 4 and 7, in which downwardly opening slots 64 are formed for the purpose of assembling the rear end of the member 60 onto the bolts 46. Accordingly, the base assembly 16 may be pivotally connected to the frame assembly by connection to the upright assemblies 14. The divergent relationship of the members 60 is maintained by an intermediate support bar or member 66 which is made of angle iron having a bottom load supporting leg 68 receiving the forward angle member 28 of the bumper jack frame 20. A further brace member 70 is provided between the diverging members 60 and connected thereto while the forward ends of the frame members 60 have mounted thereon caster wheel assemblies 72.

From the foregoing description, assembly of the base assembly 16 onto the bumper jack will be apparent. Referring therefore to FIGURE 7 in particular, it will be observed that the bumper jack 12 need only be tilted rearwardly and the base assembly 16 slid thereunder with the rear end thereof positioned above the bolt members 46 by means of which the upright assembly is connected to the frame 20 whereupon lowering of the bumper jack will bring the forward end thereof to rest upon the support leg 68 of the base assembly 16 with the slot 64 being received upon the bolt 46. Disassembly of the base assembly 16 from the bumper jack will therefore be prevented by any load tending to resist rearward tilting of the bumper jack. The slot 64 and the load supporting member 66 of the base assembly therefore constitute the only means necessary to assemble the base assembly 16 under the bumper jack and requires no fasteners or special tools.

The boom assembly 18 of the attachment is assembled in a manner similar to that described with respect to the base assembly in that no fastener means or special tools are required and that the load on the boom assembly prevents disassembly thereof. The boom assembly 18 therefore includes the main boom member 74 having a load engaging hook 76 connected by chain 78 to the forward end thereof. The rear end of the boom member 74 has connected thereto a pivot assembly bracket 80 having a pair of upwardly opening slots 82' received upon the upper rod member 48 for pivotal connection of the boom member 74 to the upper end of the upright assembly 14. The boom member 74 is supported and pivotally moved between positions as illustrated by solid and dotted lines in FIGURE 3, by means of a strut member 82. The strut member 82 is therefore pivotally connected at its upper end to a pivot bracket 84 connected as by welding to the boom member 74 intermediate the ends thereof while the lower end of the strut member 82 has pivotally connected thereto a load transferring member 86 as more clearly seen in FIGURE 5 which is removably received upon the element 40 of the load engaging assembly 38. Accordingly, raising or lowering of the load engaging assembly 38 by the hydraulic lift mechanism 30, will effect pivotal movement of the boom assembly 18. It will be further apparent, that connection of the boom assembly will be facilitated by the slotted assembly bracket 80 whereby the rear end of the boom member 74 is pivotally attached to the rod member 48 as more clearly seen in FIGURE 6, while the load of the boom member 74 is transferred by the strut member 82 and the load transferring member or saddle 86 to the load engaging assembly 38 tending to prevent disassembly of the assembly bracket member 80 from the rod member 48.

From the foregoing description, operation and utility of the crane attachment for bumper jacks will be apparent. The essential ingredients which makes the present attachment particularly useful for this purpose is the fact that it involves one component that may be attached in a rigid manner to the bumper jack without interfering with its usual operation and will thereby provide facilities for completing the assembly of the crane attachment without the use of fasteners or tools, resulting in a crane capable of handling loads for which the jack alone is not equipped. The assembled relationship of the assembled components of the crane is nevertheless assured when the crane is in use. It will also be apparent, that the attachment may be made applicable to various different types of bumper jacks which renders the present invention particularly useful for automotive repair installations.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A crane attachment for bumper jacks of the type having a wheeled frame, a vertically movable lifting mechanism mounted rearwardly on the frame, and a load engaging element comprising a transverse saddle bar connected to the lifting mechanism and extending forwardly therefrom, said attachment comprising, upright means connected to the rear portion of the frame adjacent to said lifting mechanism and extending upwardly thereabove, base means operatively connected to said rear portion of said frame adjacent said lifting mechanism and supporting a forward end of the frame, boom means operatively connected to an upper end of the upright means, and strut means operatively connected between said boom means and the saddle bar, said base means comprising a pair of spaced, elongated members receiving the frame therebetween and including rear end portions pivotally connected to said read portion thereof, and a bar extending between intermediate portions of the members, said bar receiving thereon and supporting the forward end of the frame.

2. A crane attachment for bumper jacks of the type having a wheeled frame, a vertically movable lifting mechanism mounted rearwardly on the frame, and a load engaging element comprising a transverse saddle bar connected to the lifting mechanism and extending forwardly therefrom, said attachment comprising upright means connected to the rear portion of the frame adjacent to said lifting mechanism and extending upwardly thereabove, base means operatively connected to said rear portion of said frame adjacent said lifting mechanism and supporting a forward end of the frame, boom means operatively connected to an upper end of the upright means, strut means operatively connected between said boom means and the saddle bar, and bolt means for securing a lower end of the upright means to the frame and pivotally connecting a rear end of the base means thereto.

3. The combination of claim 2 wherein said base means includes downwardly opened slot means at the rear end thereof for receiving said bolt means, wheel means mounted at a forward end of the base means and support means mounted intermediate the forward and rear ends of the base means for carrying the forward end of the frame.

4. The combination of claim 3 wherein said boom means includes a member mounted at a rear end thereof and having therein upwardly opening slots for pivotal connection to the upright means, said strut means pivotally connected intermediate the ends of the boom means and removably supported on said saddle bar.

5. A crane attachment for bumper jacks of the type having a wheeled frame, a vertically movable lifting mechanism mounted rearwardly on the frame, and a load engaging element comprising a transverse saddle bar connected to the lifting mechanism and extending forwardly therefrom, said attachment comprising upright means connected to the rear portion of the frame adjacent said lifting mechanism and extending upwardly thereabove, base means operatively connected to said rear portion of said frame adjacent said lifting mechanism and supporting a forward end of the frame, boom means operatively connected to an upper end of the upright means, and strut means operatively connected between said boom means and saddle bar, said boom means including a member mounted at a rear end thereof and having therein upwardly opening slots for pivotal connection to the upright means, said strut means pivotally connected intermediate the ends of the boom means and removably supported on said saddle bar.

6. For use on and in combination with a bumper jack including a base and a lifting mechanism comprising a transverse saddle bar mounted on said base, a crane comprising an upright mounted on the base, a forwardly extending boom pivotally mounted for vertical swinging movement on said upright, and a strut operatively connecting the saddle bar to the boom, and means for bracing the jack against forward tilting under the weight of a load on the boom, said means including a pair of spaced, elongated members receiving the base therebetween and having one end pivotally connected thereto, and a bar extending between said members and having the forward end of the base resting thereon.

7. For use on and in combination with a bumper jack including a base and a lifting mechanism comprising a transverse saddle bar mounted on said base, a crane comprising an upright mounted on the base, a forwardly extending boom pivotally mounted for vertical swinging movement on said upright, and a strut operatively connecting the saddle bar to the boom, said strut being pivotally suspended from the boom and including a free lower end engageable on the saddle bar, and means for bracing the jack against forward tilting under the weight of a load on the boom, said means including a pair of spaced, elongated members receiving the base therebetween and having one end pivotally connected thereto, and a bar extending between said members and having the forward end of the base resting thereon.

8. The combination of claim 7, together with a saddle pivotally mounted on said free end of the boom and adapted to straddle the saddle bar for operatively and detachably connecting said strut to said saddle bar.

References Cited in the file of this patent

UNITED STATES PATENTS

| | | |
|---|---|---|
| 686,425 | Sommerfeld | Nov. 12, 1901 |
| 2,446,410 | Couse | Aug. 3, 1948 |
| 2,489,056 | Stewart | Nov. 22, 1949 |
| 2,739,783 | Pentecost | Mar. 27, 1956 |
| 2,785,817 | Pappathatos et al. | Mar. 19, 1957 |
| 2,835,402 | Eggleston | May 20, 1958 |
| 2,840,255 | Pollard | June 24, 1958 |
| 2,843,280 | Stopps | July 15, 1958 |
| 3,028,145 | Brand | Apr. 3, 1962 |